(12) United States Patent
Lu

(10) Patent No.: US 6,714,317 B2
(45) Date of Patent: Mar. 30, 2004

(54) ONE-BUTTON-TRIGGERED IMAGE PROCESSING UNIT

(75) Inventor: Kuang-Rong Lu, Kaohsiung (TW)

(73) Assignee: Ulead Systems, Inc., Taipei (TW)

( * ) Notice: Subject to any disclaimer, the term of this patent is extended or adjusted under 35 U.S.C. 154(b) by 659 days.

(21) Appl. No.: 09/751,564

(22) Filed: Dec. 28, 2000

(65) Prior Publication Data

US 2002/0051249 A1 May 2, 2002

(30) Foreign Application Priority Data

Jul. 12, 2000 (TW) .................................. 89113826 A

(51) Int. Cl.⁷ .................. B41B 15/00; G06K 15/00; G06K 9/00; G06K 9/32; H04N 1/04
(52) U.S. Cl. ................. 358/1.2; 358/475; 358/3.27; 382/299; 382/300; 382/165
(58) Field of Search ................. 358/1.2, 3.27, 358/475; 382/299, 300, 165

(56) References Cited

U.S. PATENT DOCUMENTS

| | | | | | |
|---|---|---|---|---|---|
| 6,075,926 A | * | 6/2000 | Atkins et al. | ................. | 358/1.2 |
| 6,157,749 A | * | 12/2000 | Miyake | ................. | 382/300 |
| 6,263,120 B1 | * | 7/2001 | Matsuoka | ................. | 382/300 |
| 6,466,702 B1 | * | 10/2002 | Atkins et al. | ................. | 382/300 |
| 2002/0075524 A1 | * | 6/2002 | Blair et al. | ................. | 358/442 |

* cited by examiner

Primary Examiner—Edward Coles
Assistant Examiner—Houshang Safaipour
(74) Attorney, Agent, or Firm—Birch, Stewart, Kolasch & Birch, LLP

(57) ABSTRACT

A image processing unit, and particularly to a one-button-triggered image processing unit capable of processing image data automatically. This one-button-triggered image processing unit comprises a button for inputting a trigger signal so as to start on the operation of the unit; a prescan module for prescanning a target at a first resolution; a target image calculation module for calculating the first image area; a target image marking module for marking out the target image contour in the first image; a scan module for scanning the target at the second resolution assigned by a user; a target image processing module for filtering impurities and straightening on the target image of the second image area; and a crop module for abstracting the target image by the marked contour in the second image and trimming the edge of the abstracted target image to get a target the same size as the scanned target.

14 Claims, 3 Drawing Sheets

Scanner

Digital Camera

ONE-BUTTON-TRIGGERED IMAGE PROCESSING UNIT

BACKGROUND OF THE INVENTION

1. Field of the Invention

This invention relates to an image processing unit, and particularly to a one-button-triggered image processing unit capable of automatically processing image data.

2. Description of the Related Art

FIG. 1 is a schematic diagram of a typically flat-form scanner and a typically digital camera. Such a typical image inputting device, e.g. a scanner and a digital camera, is manually operated in some elementary image processes. For example, to scan and take multiple pictures and process the associated follow-up of the pictures, such as before showing the picture on a PC, straightening the pictures is needed. This wastes time and money if done manually. Additionally, it cannot keep up with the requirements of speed and efficiency needed in the current environment.

SUMMARY OF THE INVENTION

Accordingly, an object of the invention is to provide a one-button-triggered image processing unit, which can have an automatic image processing function by using a one-button trigger.

The invention is a one-button-triggered image processing unit providing an automatic image processing function by using a one-button trigger. This one-button-triggered image processing unit comprises a button for inputting a trigger signal so as to start on the operation of the unit; a prescan module for prescanning a target at a first resolution, which is lower and proportional to a second resolution that is assigned by a user, after the operation of the unit is started, thereby obtaining a first image area; a target image calculation module for calculating the first image area; a target image marking module for marking out the target image contour in the first image; a scan module for scanning the target at the second resolution assigned by a user, thereby obtaining a second image area in proportion to the first image area and finding out the target image contour in the second image area according to the proportional relation between two image areas; a target image processing module for filtering impurities and straightening on the target image of the second image area; and a crop module for abstracting the target image by the marked contour in the second image and trimming the edge of the abstracted target image to get a target the same size as the scanned target.

The invention also provides another one-button-triggered image processing unit incorporated into an image inputting device, such as a scanner or a digital camera. only the triggering button positioned on the surface of the image inputting device is different from that of the former embodiment. The method for performing is identified as the former embodiment.

The one-button-triggered image processing unit can automatically perform image processing and also has fast and convenient features. Also, the processed image data is stored in an external storage, so the processed image data can be provided to a remote user for further application, for example, making a homepage, displaying in the public, thereby increasing the application efficiency in addition to sane time.

BRIEF DESCRIPTION OF THE DRAWINGS

The invention will become apparent by referring to the following detailed description of a preferred embodiment with reference to the accompanying drawings, wherein.

DETAILED DESCRIPTION OF THE INVENTION

[First Embodiment]

Figure 1:
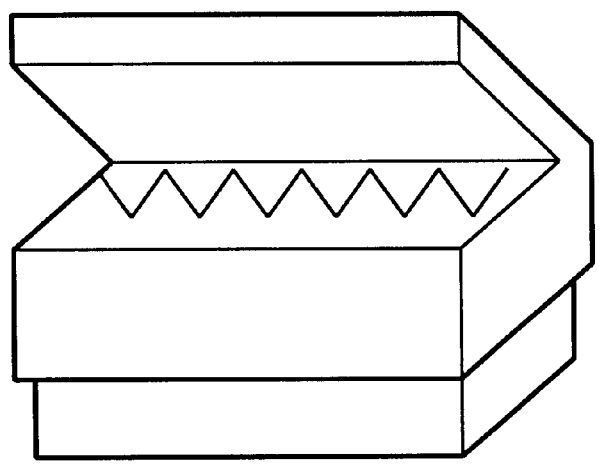
FIG. 1 is a schematic diagram illustrating a typically flat-form scanner and a typically digital camera.
Figure 1:
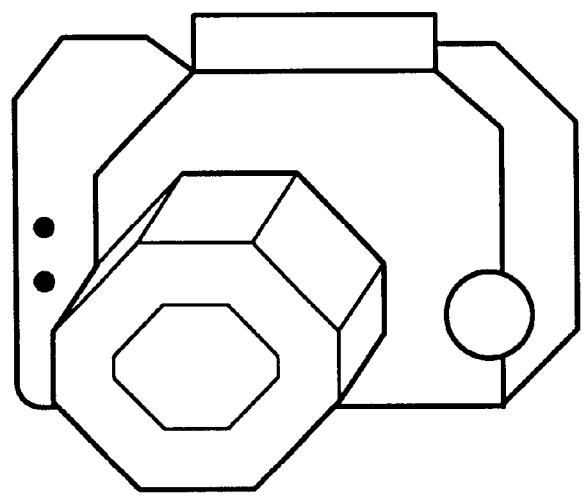
Figure 2:
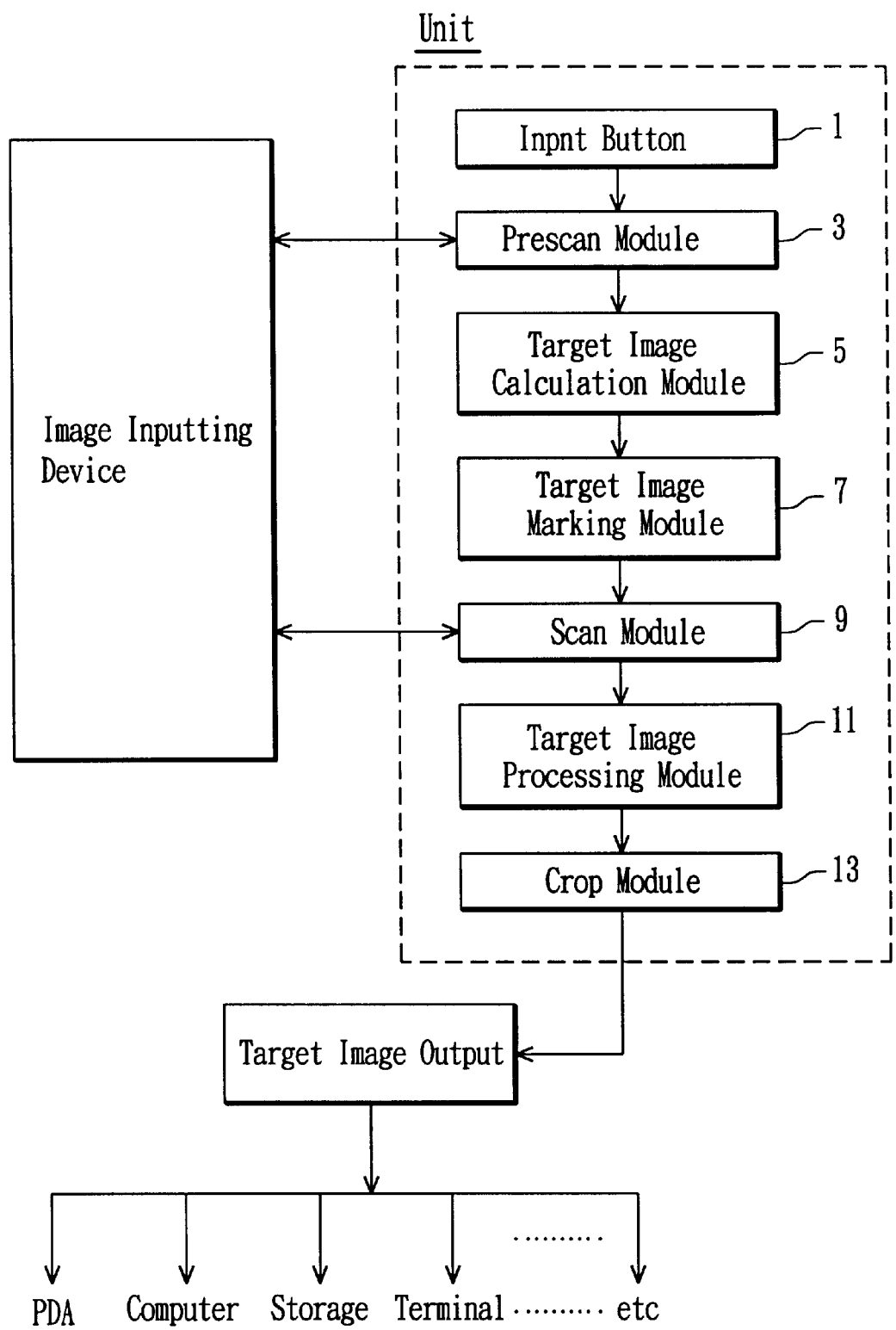
FIG. 2 is an embodiment of the invention.

Refer to FIG. 2, a first embodiment of the invention in the independent form. In this embodiment, the one-button-triggered image processing unit comprises as follows. A button 1 is used to input a trigger signal so as to start on the operation of the unit. A prescan module 3 is used to prescan target at a first resolution, which is lower and proportional to a second resolution that is assigned by a user, after the unit is started, thereby obtaining a first image area. A target image calculation module 5 is used to calculate the first image area. A target image marking module 7 is used to mark out target image in the first image area. A scan module 9 is used to scan target at the second resolution assigned by a user, thereby obtaining a second image area proportional to the first image area and finding out the target image in the second image area according to the proportional relation between two image area. A target image processing module 11 is used to filter impurities and straightening the target image. And a crop module 13 is used to abstract the target image by the marked contour in the second image area and trimming the edge of the abstracted target image to get a target contour the same as the original.

As shown in FIG. 2, the one-button-trigger image processing unit of this embodiment is an independent device connected externally to an image inputting device and an output device to form a complete image processing system. The image inputting device 2, e.g. a scanner or a digital camera, is used to trigger off a prescan action (described later) as soon as the button 1 is pushed down. The resulting image data is stored into a memory (not shown) within the image inputting device 2 for the further application, such as making a homepage on the Internet. Therefore, the storage inside the unit of the invention can be reduced to a plurality of buffers without using a large amount of memory, thereby minimizing the unit size of the invention and simplifying the unit configuration. The unit with the button 1 can be any shape and color, for exmaple, a white rectangle box, and the button 1 is located on the front surface of the unit.

The prescan action is performed by the prescan module 3 of the unit. In the prescan action, a respectively lower resolution than the full resolution assigned by a user is used, thereby obtaining a smaller scanning area fast. For example, a standard A4 paper is scanned under different resolutions, for example, 150 dpi and 300 dpi, the time spent respectively is 15 and 100 sec. The scanning time with a lower resolution is obviously reduced. Additionally, for a photo size 6"×4" with an assigned resolution 120 dpi (an full image size about 720×480) from a user is, when a scanning action is performed by half the assigned resolution, i.e. 60 dpi, an image size 360×240 (one fourth the full image size) is produced. Similarly, when using one fourth the full resolution, a 180×120 image size is produced, which is one sixteenth the full image size. Therefore, a samller image area (size) is achieved by a lower scanning resolution and a shorter time, i.e. by a prescan action. After prescanning, the smaller image area scanning data is input to the target image calculation module 5 for calculating the smaller image area. The calculation of finding out all target image areas, for example, the image areas of a plurality of photos. The target image marking module marks all target image area contour out based on the resulting values of the calculation. Although the prescan action can quickly acquire a miniature of the full image area for processing, the prescan action can incur image distortion and the quality of the miniature is unacceptable. Thus, a scan with the full resoltuion is necessary and performed by the scan module 9 to produce a full image. The scan module 9 also marks out all target image areas in the full image area based on the target image areas marked from the prescan action. That is, the difference between the smaller image area from prescanning and the the full image area from scanning has a certain proportion. The calculation for the pixel relation between the two target image areas in the smaller and full image area, respectively, can be simply performed by using this certain proportion (such as one fourth). Therefore, the target image areas in the full image area can be easily marked out. The target image processing module 11 is responsible for filtering the impurities of all target image areas and straightening all slanting target images. The impurity-included target image can be filtered by a filter (not shown), and straightened using a conventional technique, for example, using Hough Transform to find the required direction and angle for straightening. The crop module 13 abstracts all target image (areas) processed by the target image processing module 11 from the scanned image, and however, the target image shape abstracted is not a complete rectangle. Thus, it is necessary to crop all target images after trimming around the abstracted target images exactly same shape as the scanned targets. The cropped target images can be outputted by any output device in the art, for example, a PC, a printer, a storage such as a CD or a DVD, a network terminal, or a Personal Digital Assitant (PDA).

[Second Embodiment]

Figure 3:
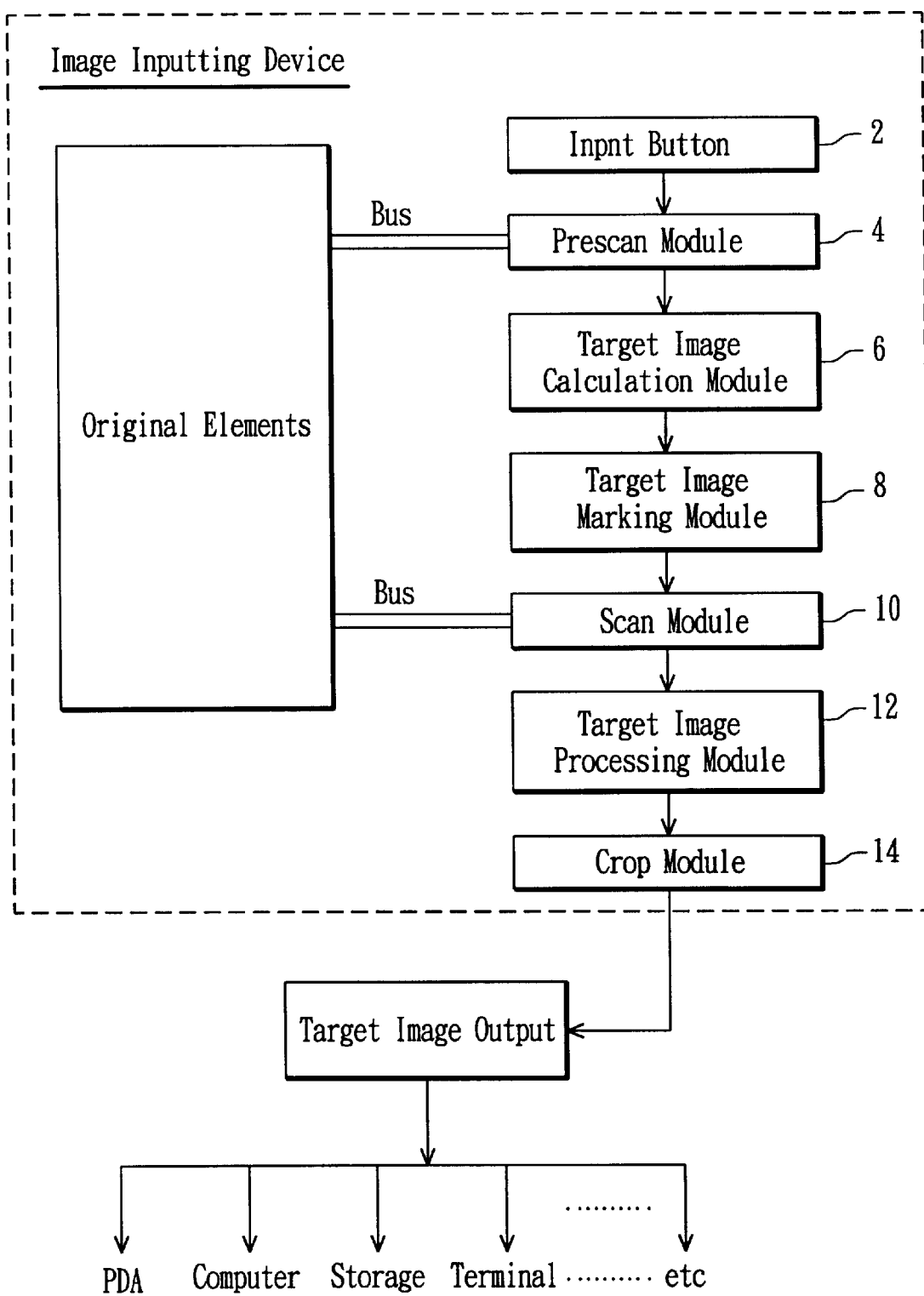
FIG. 3 is another embodiment of the invention.

Refer to FIG. 3, a second embodiment of the invention in the incorporated form. In FIG. 3, the one-button-triggered image processing unit comprises as follows. An input button 2 on the surface of an image inputting device is used to input a trigger signal so as to start on the operation of the image inputting device. A prescan module 4 is used to prescan target at a first resolution, which is lower and proportional to a second resolution that is assigned by a user, after the unit is started, thereby obtaining a first image area. A target image calculation module 6 is used to calculate the first image area; a target image marking module 8 for marking out target image in the first image area. A scan module 10 is used to scan target at the second resolution assigned by a user, thereby obtaining a second image area proportional to the first image area and finding out the target image in the second image area according to the proportional relation between two image area. A target image processing module 12 is used to filter impurities and straightening the target image. And a crop module 14 is used to abstract the target image by the marked contour in the second image area and trimming the edge of the abstracted target image to get a target contour the same as the original.

In this embodiment, compared to the first embodiment, the only difference is the configuration. As shown in FIG. 3, the one-button-triggered image processing unit in FIG. 2 is incorporated into an image inputting device as a part of the image inputting device. Further, the unit communicates with the image inputting device by internal bus other than by a communication interface (not shown) such as a SCSI, in the first embodiment.

When the modules of the second embodiment are implemented on an IC and incorporated into an image inputting device, e.g. a scanner, the operating speed is quicker than the first embodiment due to the internal bus, even though in such a way, the wiring of the unit and the image inputting device is increased. Also, the input button is incorporated onto the surface of the image inputting device. Hence, the operation of the device has the same convenience as a user in the first embodiment.

Therefore, the one-button-triggered image processing unit of the invention is used for automatically producing the image processing function. The input button, whether on a dependent unit or on an image inputting device, is convenient to use. Furthermore, the invention, whether in an independent form or in an incorporated form, the image processing speed is quicker due to the prescan step. Moreover, although the independent unit needs some space, the independent unit can be incorporated with other image inputting devices to increase the application. On the other hand, although the incorporated unit is fixed within an image inputting device, the incorporated unit increases an added value of the image inputting device.

Although the invention has been described in its preferred embodiment, it is not intended to limit the invention to the precise embodiment disclosed herein. Those who are skilled in this technology can still make various alterations and modifications without departing from the scope and spirit of this invention. Therefore, the scope of the invention shall be defined and protected by the following claims and their equivalents.

What is claimed is:

1. An image processing unit with one button trigger, comprising:

a button for inputting a trigger signal, so as to start on the operation of the unit;

a prescan module for prescanning a target at a first resolution, which is lower and proportional to a second resolution that is assigned by a user, after the operation of the unit is started, thereby obtaining a first image area;

a target image calculation module for calculating the first image area;

a target image marking module for marking out the target image contour in the first image;

a scan module for scanning the target at the second resolution assigned by a user, thereby obtaining a second image area in proportion to the first image area and finding out the target image contour in the second image area according to the proportional relation between two image areas;

a target image processing module for filtering impurities and straightening on the target image of the second image area; and a crop module for abstracting the target image by the marked contour in the second image and trimming the edge of the abstracted target image to get a target the same as size as the scanned target.

2. The image processing unit of claim 1, wherein the one-button-triggered image processing unit is an independent device, which is connected externally to an image inputting device and an output device so as to implement as a complete image processing system.

3. The image processing unit of claim 2, wherein the image inputting device, the output device, and the image processing unit communicate with each other via any one standard communication interface.

4. The image processing unit of claim 2, wherein the image inputting device is one of a scanner and a digital camera.

5. The image processing unit of claim 2, wherein the output device is one of the following: a computer, a network terminal, a storage or a PDA.

6. The image processing unit of claim 5, wherein the storage is any device capable of storing data.

7. The image processing unit of claim 1, wherein the second resolution is regarded as a full resolution based on the user assigned.

8. An image processing unit with one button trigger, which is incorporated into an image inputting device, comprises:

an input button on the surface of the image inputting device, for inputting a trigger signal so as to start on the operation of the image inputting device;

a prescan module for prescanning a target at a first resolution, which is lower and proportional to a second resolution that is assigned by a user, after the operation of the unit is started, thereby obtaining a first image area;

a target image calculation module for calculating the first image area;

a target image marking module for marking out the target image contour in the first image;

a scan module for scanning the target at the second resolution assigned by a user, thereby obtaining a second image area in proportion to the first image area and finding out the target image contour in the second image area according to the proportional relation between two image areas;

a target image processing module for filtering impurities and straightening on the target image of the second image area; and a crop module for abstracting the target image by the marked contour in the second image and trimming the edge of the abstracted target image to get a target the same as size as the scanned target.

9. The image processing unit of claim 8, wherein the one-button-triggered image processing unit is an IC including the modules and incorporated into the image inputting device implemented on the input button on the surface, which is connected externally to an output device so as to implement a complete image processing system.

10. The image processing unit of claim 9, wherein the internal bus is used for the communication between the image inputting device and the image processing unit, and any one standard communication interface is used for the communication between the image inputting device and the output device.

11. The image processing unit of claim 9, wherein the image inputting device is one of a scanner and a digital camera.

12. The image processing unit of claim 9, wherein the output device is one of a computer, a network terminal, a storage and a PDA.

13. The image processing unit of claim 12, wherein the storage is any device capable of storing data.

14. The image processing unit of claim 8, wherein the second resolution is regarded as a full resolution based on the user assigned.

* * * * *